US012636523B2

(12) United States Patent
Reinpold

(10) Patent No.: US 12,636,523 B2
(45) Date of Patent: May 26, 2026

(54) BUILDING EMERGENCY EGRESS AND RESCUE SYSTEM

(71) Applicant: Philip Reinpold, Pueblo West, CO (US)

(72) Inventor: Philip Reinpold, Pueblo West, CO (US)

(*) Notice: Subject to any disclaimer, the term of this patent is extended or adjusted under 35 U.S.C. 154(b) by 434 days.

(21) Appl. No.: 18/323,893

(22) Filed: May 25, 2023

(65) Prior Publication Data

US 2024/0390708 A1 Nov. 28, 2024

(51) Int. Cl.
*A62B 1/20* (2006.01)

(52) U.S. Cl.
CPC .................................... *A62B 1/20* (2013.01)

(58) Field of Classification Search
CPC ... A62B 1/20; A62B 35/0043; A62B 35/0056; A62B 35/0068
See application file for complete search history.

(56) References Cited

U.S. PATENT DOCUMENTS 301,923 A * 7/1884 Reisdorff .............. B61B 12/005 182/7
538,626 A * 4/1895 Schmitt ................... F42B 10/14 102/504
3,026,959 A * 3/1962 Sweigart .................. A62B 1/02 182/11
3,669,087 A 6/1972 Hamrick et al.
4,154,320 A * 5/1979 Jatczak .................... A62B 1/20 182/48
4,256,199 A * 3/1981 Sellards ................... A62B 1/00 188/65.4
6,182,789 B1 2/2001 Okamura
6,189,455 B1 * 2/2001 Thompson .............. B66C 21/00 104/126
6,244,261 B1 6/2001 West, Jr.
10,213,700 B2 2/2019 Cylvick
2003/0146045 A1 * 8/2003 Porter, Jr. ............... F42B 12/68 182/11
2004/0060773 A1 * 4/2004 Nir ........................... A62B 1/20 182/48

FOREIGN PATENT DOCUMENTS

CN 104800984 A * 7/2015 ............... A62B 1/20
CN 105536158 A * 5/2016
CN 106466511 A * 3/2017
CN 105233435 B * 12/2018
GB 2171658 A * 9/1986 ............... A62B 1/20

* cited by examiner

*Primary Examiner* — Cassandra Davis

(57) ABSTRACT

A building emergency egress and rescue system includes a first cable, a second cable, a first cable launching device, a first cable docking device, and a second cable docking device. The first end of the second cable is adapted to be affixed to the first building. The second end of the second cable is adapted to be guided to the second building along the first cable by a guide member. The first cable docking device is located at the second building and configured to receive and secure the second end of the first cable. The first cable launching device is configured to launch the second end of the first cable to the first cable docking device. The second cable docking device is located at the second building and configured to receive and secure the second end of the second cable.

20 Claims, 11 Drawing Sheets

BUILDING EMERGENCY EGRESS AND RESCUE SYSTEM

FIELD OF THE INVENTION

The present invention relates generally to emergency evacuation systems for buildings. More specifically, the present invention is a Building Emergency Egress and Rescue System that extends from a first building to an adjacent building and/or several adjacent buildings. It also incorporates the ability to rescue individuals from several different floors of the same building simultaneously.

BACKGROUND OF THE INVENTION

Fires and other emergency situations require immediate evacuation of the building in order to minimize injury to individuals trying to escape from the building. The problems with respect to such disasters have been more serious in multi-story buildings as evacuation is much more difficult than that of a single-story building. Most multi-story buildings have only a single staircase exit from the upstairs and those multi-story buildings that have elevators are unable to use them in times of disasters.

Individuals routinely work and live at elevations that do not permit safe free-fall drops in emergency situations. Ladders are often unavailable or inadequate in height. Jumping from a window or from a roof is many times the only tenable option. Alternative evacuation plans for individuals, such as helicopter evacuations from rooftops, are time consuming, costly, dangerous, and often impossible due to fire, explosions, surrounding buildings and weather.

Therefore, it is an objective of the present invention to provide a building emergency egress and rescue system that overcomes the problems set forth above.

SUMMARY OF THE INVENTION

The present invention discloses a building emergency egress and rescue system that comprises a first cable (i.e., a pilot line), a second cable (i.e., a rescue cable), a first cable launching device, a first cable docking device, and a second cable docking device. The pilot line is attached to the receiving structure, and this is used to route and attach the rescue cable quickly and efficiently. This is critical, as time is of the essence in an emergency. The rescue cable and rescue station are co-located to allow for the fastest possible accommodation of individuals at risk.

The first cable comprises a first end and a second end. The first end of the first cable is adapted to be affixed to a first building, and the second end of the first cable is adapted to be attached to a second building. The second cable comprises a first end and a second end. The first end of the second cable is adapted to be affixed to the first building. The second end of the second cable is adapted to be guided to the second building along the first cable by a guide member. The second end of the second cable is lower in elevation than the first end of the second cable. The first cable docking device is located at the second building and configured to receive and secure the second end of the first cable. The first cable launching device is configured to launch the second end of the first cable to the first cable docking device. The second cable docking device is located at the second building and configured to receive and secure the second end of the second cable.

BRIEF DESCRIPTION OF THE DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the present invention. That is, the dimensions of the components of the present invention, independently and in relation to each other can be different. It should be noted that the drawings are schematic and not necessarily drawn to scale. Some drawings are enlarged or reduced to improve drawing legibility.

DETAIL DESCRIPTIONS OF THE INVENTION

Figure 1:
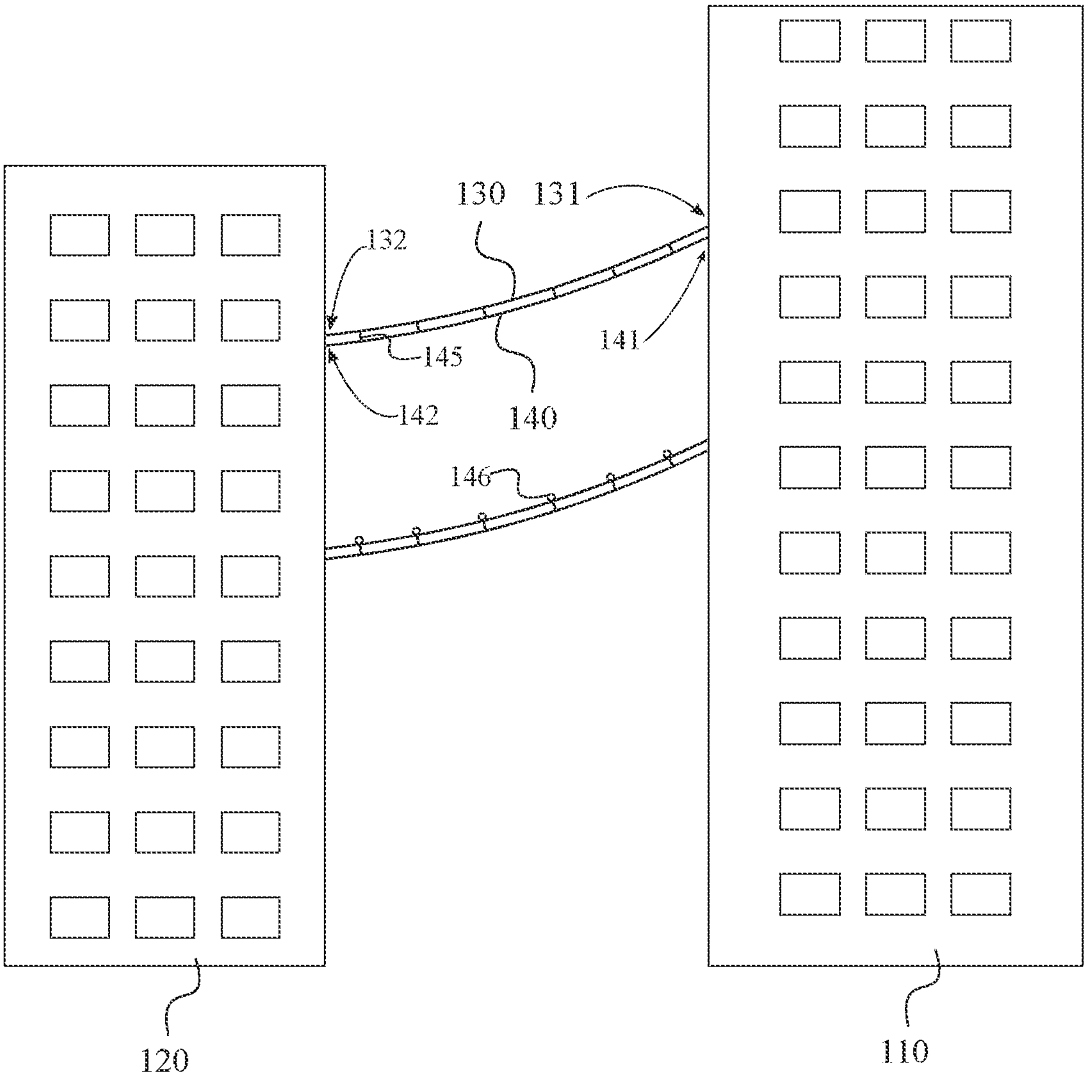
FIG. 1 depicts an overall view showing the concept of the present invention.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and is made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. When not explicitly defined herein, to the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, “a” and “an” each generally denotes “at least one,” but does not exclude a plurality unless the contextual use dictates otherwise. When used herein to join a list of items, “or” denotes “at least one of the items,” but does not exclude a plurality of items of the list. Finally, when used herein to join a list of items, “and” denotes “all of the items of the list.”

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subject matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification and are to be considered a portion of the entire written description of this invention. As used in the following description, the terms “horizontal”, “vertical”, “left”, “right”, “up”, “down” and the like, as well as adjectival and adverbial derivatives thereof (e.g., “horizontally”, “rightwardly”, “upwardly”, “radially”, etc.), simply refer to the orientation of the illustrated structure as the particular drawing figure faces the reader. Similarly, the terms “inwardly,” “outwardly” and “radially” generally refer to the orientation of a surface relative to its axis of elongation, or axis of rotation, as appropriate. As used herein, the term “proximate” refers to positions that are situated close/near in relationship to a structure. As used in the following description, the term “distal” refers to positions that are situated away from positions.

The present disclosure includes many aspects and features. Moreover, while many aspects and features relate to, and are described in the context of building emergency egress and rescue system, embodiments of the present disclosure are not limited to use only in this context.

The present invention is a building emergency egress and rescue system that is specifically designed to facilitate the evacuation of occupants from one or several multi-story buildings. It is an aim of the present invention to provide a building emergency egress and rescue system that allows occupants to evacuate from a first multi-story building quickly and safely to an adjacent building. It is another aim of the present invention to allow simultaneous evacuation from multiple floors.

Referring now to the figures of the present disclosure. The building emergency egress and rescue system of the present invention comprises a first cable 130, a second cable 140, a first cable launching device 150, a first cable docking device 160, and a second cable docking device 170.

In reference to FIG. 1, the first cable 130 is a pilot line and configured to extend from a first building 110 to a second building 120 that is adjacent to the first building 110. It should be noted that the first cable 130 can be of any shape, size, material, features, type or kind, orientation, location, quantity, components, and arrangements of components that would allow the present invention to fulfill the objectives and intents of the present invention. In one embodiment, the first cable 130 is stored in the first building 110 and can be deployed in case of emergency. The first cable 130 comprises a first end 131 and a second end 132. The first end 131 of the first cable 130 is adapted to be affixed to the first building 110, while the second end 132 of the first cable 130 is adapted to be attached to a second building 120. In the event of a fire or other emergency, a user may first affix the first end 131 of the first cable 130 to the first building 110 and then employ a first cable launching device 150 to launch the second end 132 of the first cable 130 to the first cable docking device 160, which is located at the second building 120 and configured to receive and secure the second end 132 of the first cable 130. In one embodiment where the distance between buildings is not significant, the second end 132 of the first cable 130 can be sent to the first cable docking device 160 utilizing a propelled charge (similar to refuel at sea pilot line). The first cable launching device 150 may be operated manually or automatically to aim and target the first cable docking device 160, and then the second end 132 of the first cable 130 may be launched by the first cable launching device 150. For example, the first cable launching device 150 may be a gas-powered shotgun to launch the second end 132 of the first cable 130 to the first cable docking device 160. If the first cable docking device 160 fails to receive and catch the second end 132 of the first cable 130, the second end 132 of the first cable 130 may be retracted back to the user and a second launch is required.

Figure 2:
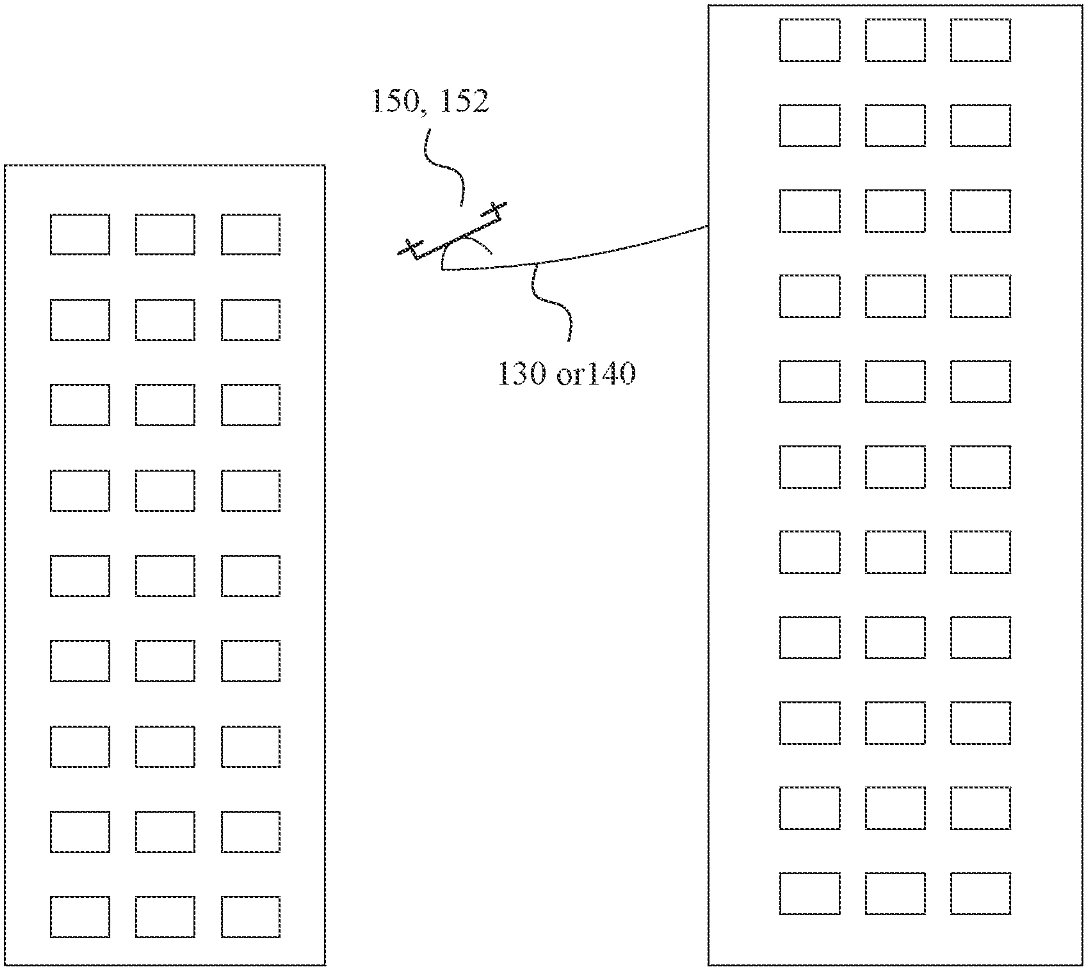
FIG. 2 depicts another overall view of the present invention, wherein an unmanned aerial vehicle is used to launch a cable.
Figure 3:
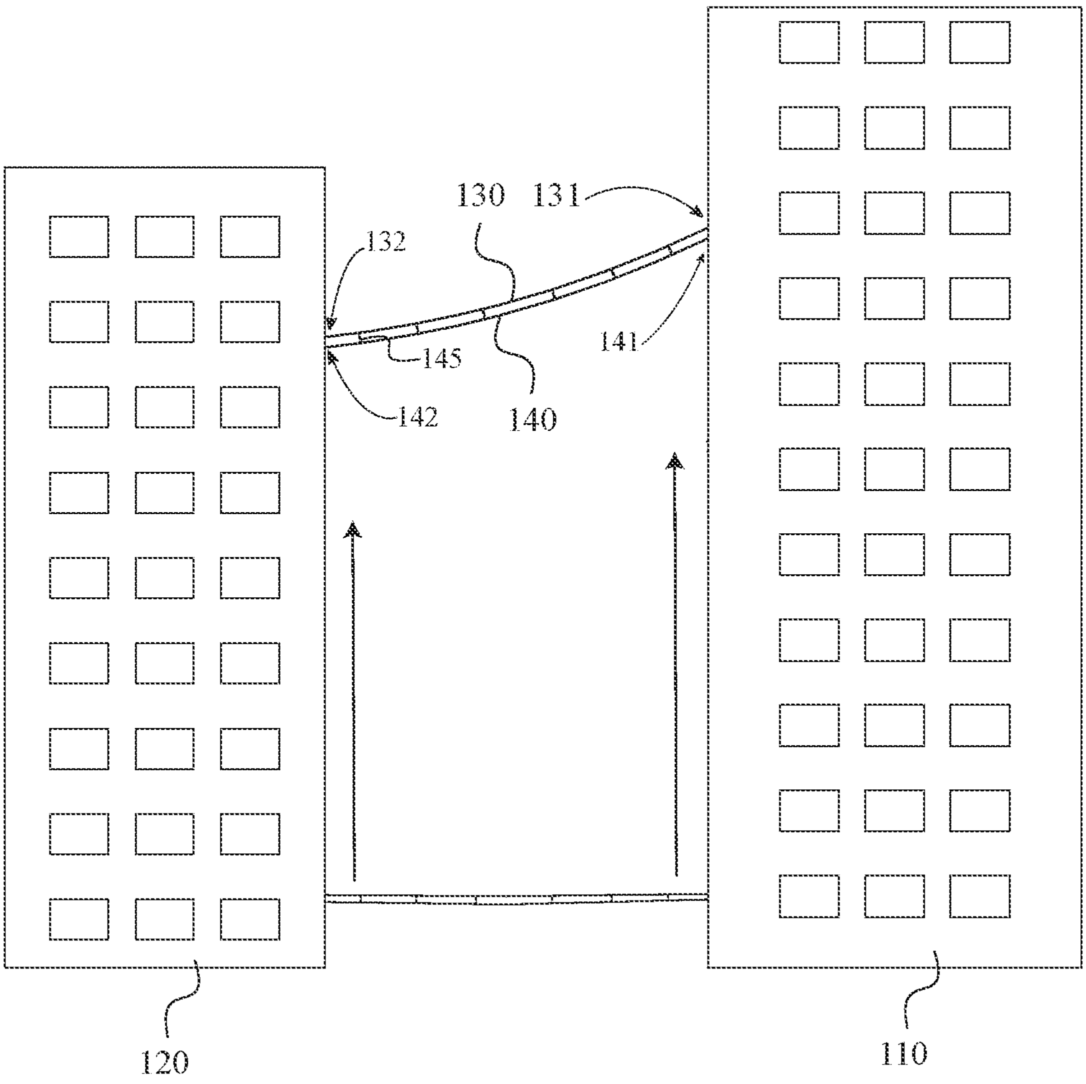
FIG. 3 depicts another overall view of the present invention, wherein cables are elevated to a desired rescue location.

In another embodiment where the distance between buildings is so significant that the second end 132 of the first cable 130 cannot be launched to the first cable docking device 160 using the propelled charge or where atmospheric or high wind conditions would interfere with the successful attachment of the cables, the first cable 130 or second cable 140 is deployed on the ground between the buildings, and then elevated utilizing an external drive to the proper level for the rescue of the trapped occupants, as shown in FIG. 3. In a further embodiment, the first cable launching device 150 comprises an unmanned aerial vehicle (UAV) 152, as shown in FIG. 2. The UAV152 may be controlled by a rescue crew to carry the second end 132 of the first cable 130 to the first cable docking device 160. In another embodiment, the unmanned aerial vehicle 152 may be specifically programmed to automatically deliver the second end 132 of the first cable 130 to the first cable docking device 160. It should be also noted that the UAV 152 can also be used to directly launch the second cable 140.

Figure 4:
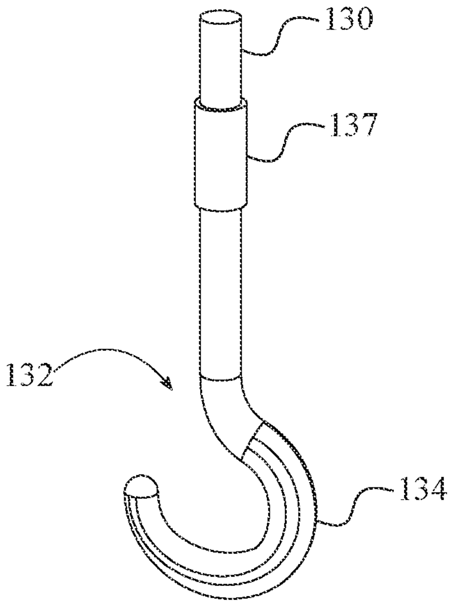
FIG. 4 depicts a perspective view of the second end of the first cable of the present invention.
Figure 5:
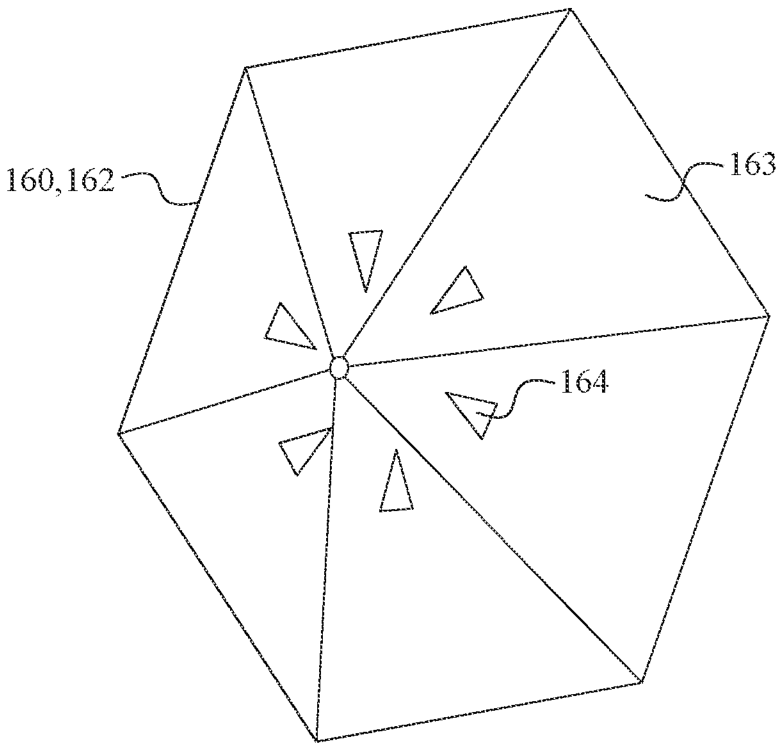
FIG. 5 depicts a catching parasol of the present invention, wherein the catching parasol is unfolded.

Preferably, the first cable docking device 160 comprises a catching parasol 162 located at the second building 120. The first cable 130 further comprises an attachment means 134 at the second end 132 of the first cable 130, while the catching parasol 162 comprises a catching means 164. The attachment means 134 is adapted to be anchored to the catching means 164. As shown in FIGS. 4-5, the attachment means 134 comprises a hook, and the catching means 164 comprises a plurality of barbs arranged at an interior surface 163 of the catching parasol 162. Please also note that other compatible or suitable attachment and catching means are also contemplated. In the illustrated configuration, the catching parasol 162 is unfolded to provide a larger and more accurate target for the first cable 130. Once the second end 132 of the first cable 130 is received in the catching parasol 162, the catching parasol 162 is folded such that the plurality of barbs arranged at the interior surface 163 of the catching parasol 162 can capture the second end 132 of the first cable 130. It is preferred that the second end 132 of the first cable 130 is lower in elevation than the first end 131 of the first cable 130 to facilitate the deployment of the second cable 140. In a preferred embodiment, the first cable 130 further comprises a first cable tensioner 137 adjacent to the second end 132 of the first cable 130.

Figure 6:
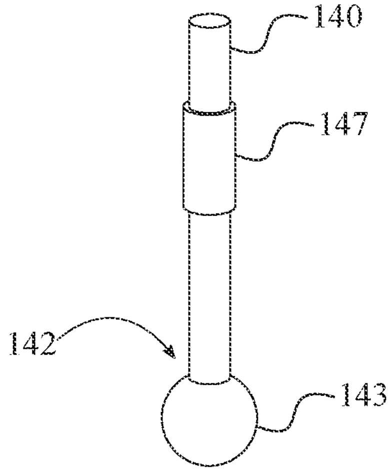
FIG. 6 depicts the second end of the second cable of the present invention.

In reference to FIGS. 1 and 6, the second cable 140 is the primary rescue cable and is configured to allow users to evacuate from the first building 110 to the second building 120 quickly and safely. It should be noted that the second cable 140 can be of any shape, size, material, features, type or kind, orientation, location, quantity, components, and arrangements of components that would allow the present invention to fulfill the objectives and intents of the present invention. In one embodiment, the second cable 140 comprises a first end 141 and a second end 142. The first end 141 of the second cable 140 is adapted to be affixed to the first building 110, while the second end 142 of the second cable 140 is adapted to be guided to the second building 120 along the first cable 130 by a guide member 145. In one embodiment, the guide member 145 comprises one or more sliding mechanisms (e.g., hooks, rings, etc.) that are designed to carry the second cable 140 and attach to the first cable 130 in order to slide along the first cable 130. In this configuration, the second end 142 of the second cable 140 can be delivered to the second building 120 due to gravity. In one embodiment, the guide member 145 comprises one or more rollers 146 that can slide along the first cable 130.

The second end 142 of the second cable 140 is lower in elevation than the first end 141 of the second cable 140 such that a user can slide along second cable 140 from the first building 110 to the second building 120. In the present invention, the second end 132 of the first cable 130 and the second end 142 of the second cable 140 are co-located to allow for the fastest possible accommodation of individuals at risk. Moreover, the second end 142 of the second cable 140 may be lower than the second end 132 of the first cable 130. In one embodiment, the second cable 140 is a steel cable. However, it is contemplated that the second cable 140 can also be made of any other material that is flexible, durable, and fire resistant. In another preferred embodiment, the second cable 140 further comprises a second cable tensioner 147 adjacent to the second end 142 of the second cable 140 to tension the second cable 140 in order to assure a proper angle and operation.

Figure 7:
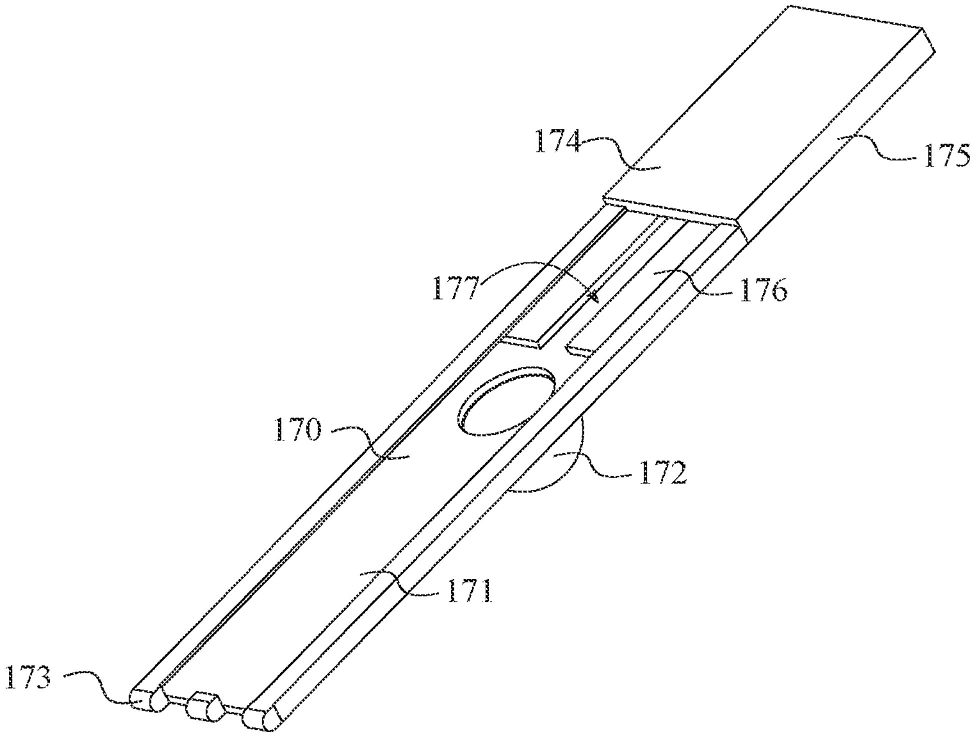
FIG. 7 depicts a perspective view of the second cable docking device of the present invention.
Figure 8:
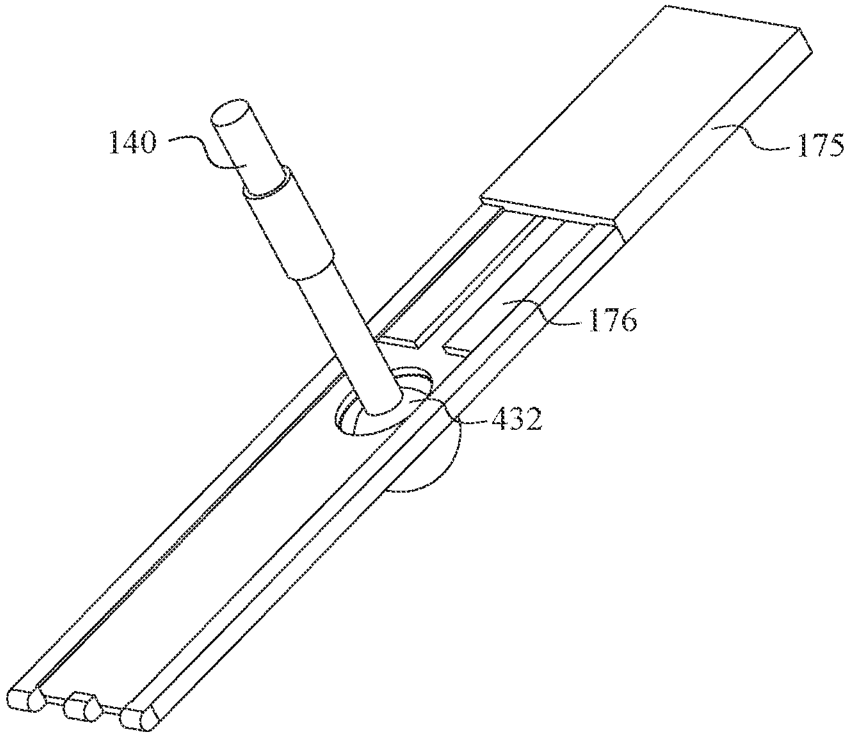
FIG. 8 depicts a perspective view of the second cable docking device of the present invention, wherein the ball-like member is received in the ball-shaped groove.
Figure 9:
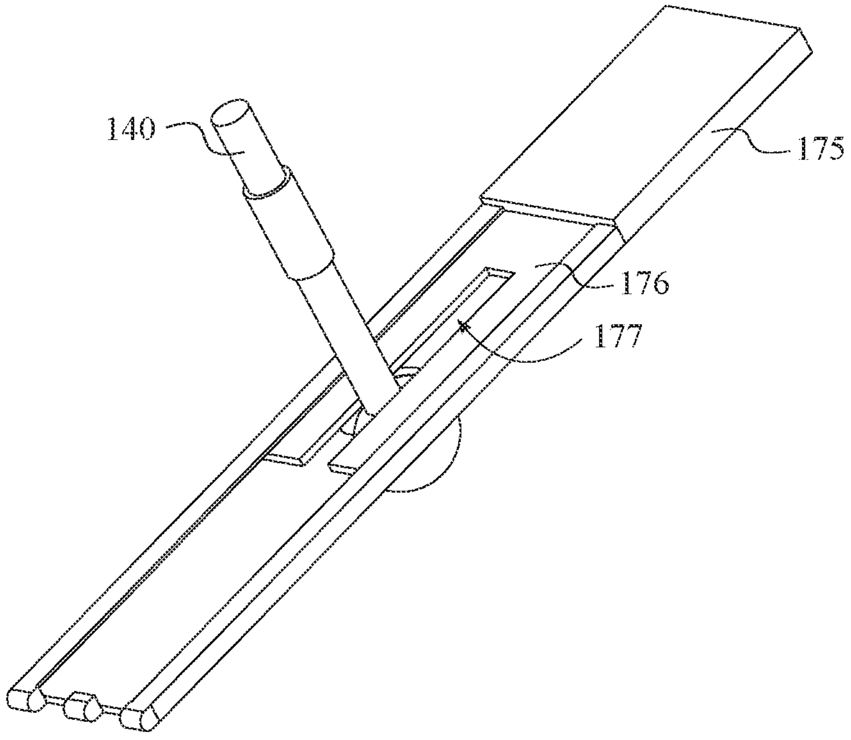
FIG. 9 depicts a perspective view of the second cable docking device of the present invention, wherein the ball-like member is received in the ball-shaped groove which is closed by the cover.

The second cable docking device 170 is located at the second building 120 and configured to receive and secure the second end 142 of the second cable 140. It should be noted that the second cable docking device 170 can be of any shape, size, material, features, type or kind, orientation, location, quantity, components, and arrangements of components that would allow the present invention to fulfill the objectives and intents of the present invention. In a preferred embodiment illustrated in FIG. 6, the second cable 140 further comprises a ball-like member 143 at the second end 142 of the second cable 140. As shown in FIGS. 7-9, the second cable docking device 170 comprises a mounting plate 171 and a securing assembly 174. The mounting plate 171 comprises a ball-shaped groove 172 adapted to receive the ball-like member 143 of the second cable 140. The securing assembly 174 comprises a spring latch 175 and a cover 176. The spring latch 175 is configured to push the cover 176 to close the ball-shaped groove 172. The cover 176 comprises a slit 177 adapted for the second cable 140 to travel through. The slit 177 allows the ball-like member 143 to swivel in the ball-shaped groove 172 to adjust the angle of the second cable 140. Once the ball-like member 143 of the second cable 140 is received in the ball-shaped groove 172, the spring latch 175 pushes the cover 176 to close the ball-shaped groove 172 to securely attach the second end 142 of the second cable 140 to the second building 120. This arrangement also allows for articulation of the second cable 140 as necessary to compensate for loads, wind effects, position, etc. In a preferred embodiment, the mounting plate 171 further comprises a hinge 173 fixed to the second building 120. Once the second cable 140 is received and secured by the second cable docking device 170, the first cable 130, together with the guide member 145, may be removed and the second cable 140 is ready for use.

Figure 10:
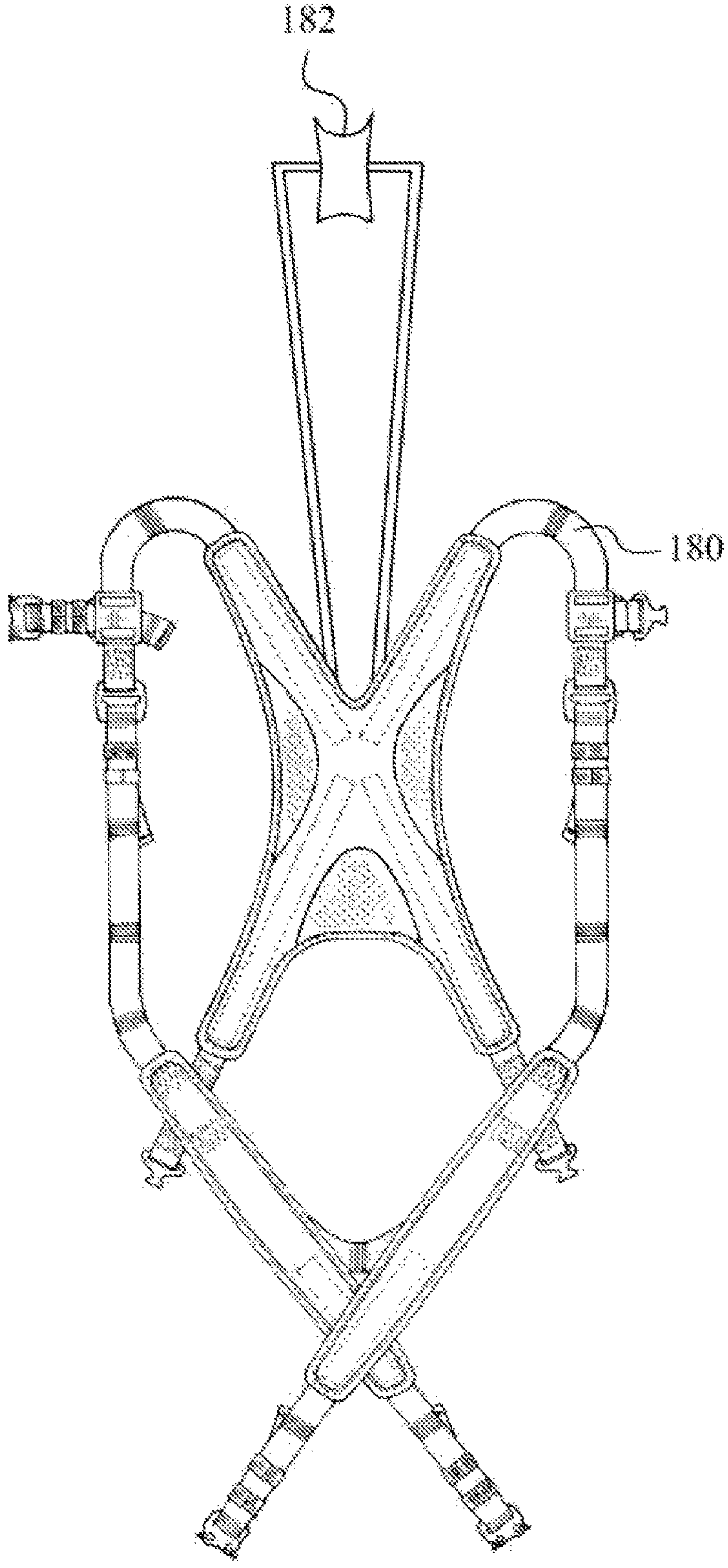
FIG. 10 depicts a harness of the present invention.

In one embedment, the building emergency egress and rescue system of the present invention further comprises a harness 180 adapted to be worn by a user, as shown in FIG. 10. The harness 180 is designed to carry the user to the second building 120 safely and quickly. In the illustrated embodiment, the harness 180 is provided with a pulley 182 adapted to slide along the second cable 140 from the first building 110 to the second building 120. In a preferred embodiment, the harness 180 is provided with a braking device such that the user can stop descending whenever necessary. However, other mechanisms are also contemplated to allow efficient evacuation.

Figure 11:
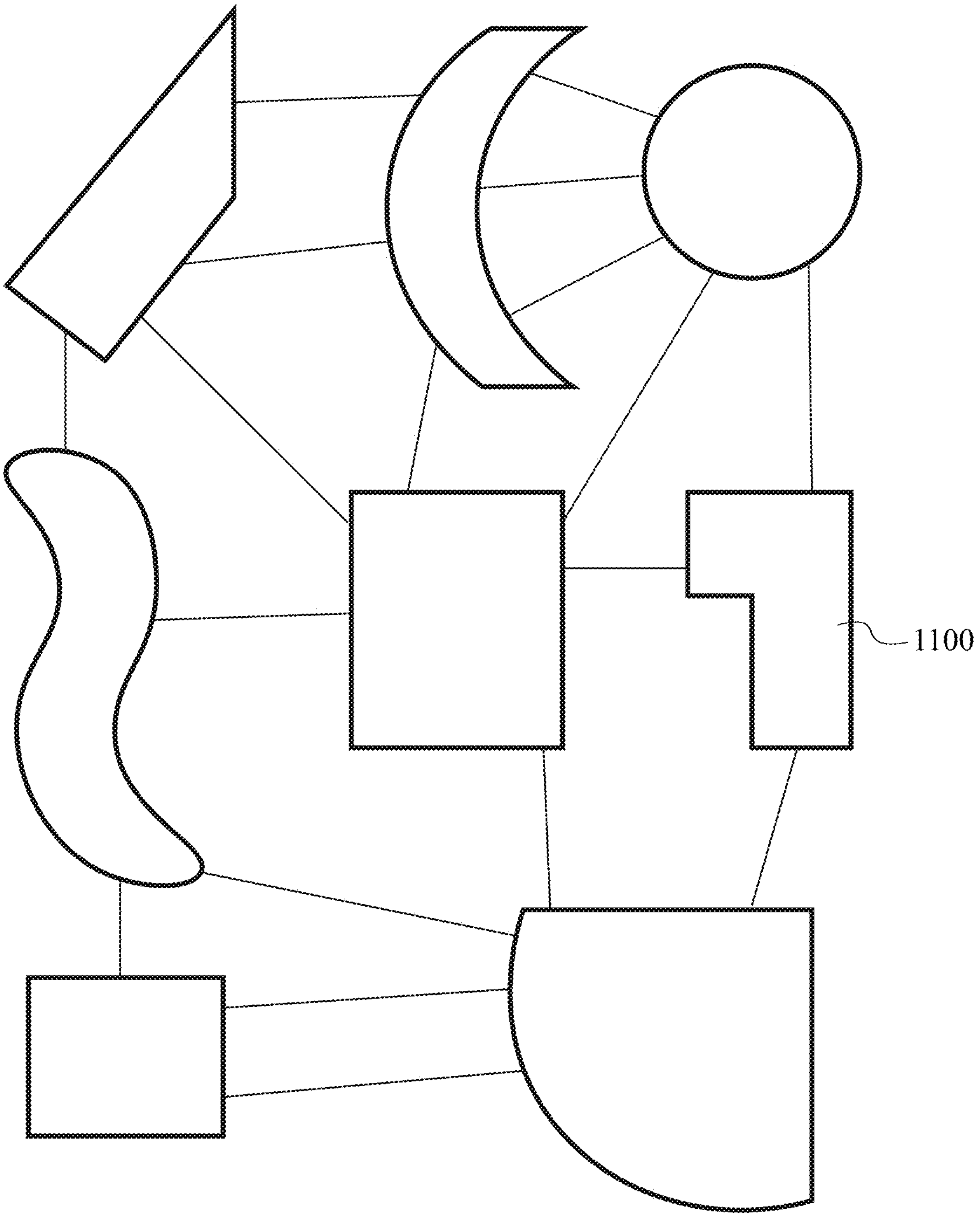
FIG. 11 schematically depicts multiple instances of the present invention installed between multiple buildings.

In order to ensure that the speed of the rescued occupants would not become excessive as they traveled between buildings, the angle of the second cable 140 between building would also be kept to a level that would ensure that the individuals being rescued would not attain too much speed while traveling to the second building 120. In addition or in the alternative, the harness 180 may comprise a clutch or friction unit that would prevent the forward speed of the occupants from becoming too fast. It should be noted that a plurality of second cables could be employed simultaneously to extract at risk occupants from different locations in the damaged building. It should be further noted that the present invention may be installed in multiple buildings 1100 in a metro area to help assure the safe extraction of occupants in a large area, as schematically shown in FIG. 11. Any one of the buildings could be damaged and need assistance, and any of the buildings could serve either as a rescue station or the primary launching station.

Although the disclosure has been explained in relation to its preferred embodiment, it is to be understood that many other possible modifications and variations can be made without departing from the spirit and scope of the disclosure.

What is claimed is:

1. A building emergency egress and rescue system, comprising:
a first cable;
a second cable;
a first cable launching device;
a first cable docking device;
a second cable docking device;
the first cable comprising a first end and a second end;
the first end of the first cable being adapted to be affixed to a first building, and the second end of the first cable being adapted to be attached to a second building;
the second cable comprising a first end and a second end;
the first end of the second cable being adapted to be affixed to the first building;
the second end of the second cable being adapted to be guided to the second building along the first cable by a guide member;
the second end of the second cable being lower in elevation than the first end of the second cable;
the first cable docking device being located at the second building and configured to receive and secure the second end of the first cable;
the first cable launching device being configured to launch the second end of the first cable to the first cable docking device; and
the second cable docking device being adapted to be located at the second building and configured to receive and secure the second end of the second cable.

2. The building emergency egress and rescue system as claimed in claim 1, wherein the second cable is a steel cable.

3. The building emergency egress and rescue system as claimed in claim 1, wherein the first cable launching device comprises an unmanned aerial vehicle.

4. The building emergency egress and rescue system as claimed in claim 1, wherein the second end of the second cable is lower than the second end of the first cable.

5. The building emergency egress and rescue system as claimed in claim 1, wherein the first cable docking device comprises a catching parasol located at the second building.

6. The building emergency egress and rescue system as claimed in claim 5, wherein the first cable further comprises an attachment means at the second end of the first cable, while the catching parasol comprises a catching means, the attachment means being adapted to be anchored to the catching means.

7. The building emergency egress and rescue system as claimed in claim 6, wherein the attachment means comprises a hook, and the catching means comprises a plurality of barbs arranged at an interior surface of the catching parasol.

8. The building emergency egress and rescue system as claimed in claim 1, wherein the first cable further comprises a first cable tensioner adjacent to the second end of the first cable.

9. The building emergency egress and rescue system as claimed in claim 1, wherein the second cable further comprises a second cable tensioner adjacent to the second end of the second cable.

10. The building emergency egress and rescue system as claimed in claim 1, wherein the second cable further comprises a ball-like member at the second end of the second cable.

11. The building emergency egress and rescue system as claimed in claim 1, wherein the second cable docking device comprises:
a mounting plate;
a securing assembly;
the mounting plate comprising a ball-shaped groove adapted to receive a ball-like member of the second cable;
the securing assembly comprising a spring latch and a cover;
the spring latch being configured to push the cover to close the ball-shaped groove; and
the cover comprising a slit adapted for the second cable to travel through.

12. The building emergency egress and rescue system as claimed in claim 11, wherein the mounting plate further comprises a hinge fixed to the second building.

13. The building emergency egress and rescue system as claimed in claim 1, further comprising:
a harness adapted to be worn by a user; and
the harness being provided with a pulley adapted to slide along the second cable from the first building to the second building.

14. The building emergency egress and rescue system as claimed in claim 1, the guide member comprises one or more rollers adapted to slide along the first cable.

15. The building emergency egress and rescue system as claimed in claim 1, wherein the second end of the first cable is lower in elevation than the first end of the first cable.

16. A building emergency egress and rescue system, comprising:
a first cable;
a second cable;
a first cable launching device;
a first cable docking device;
a second cable docking device;
the first cable comprising a first end and a second end;
the first end of the first cable being adapted to be affixed to a first building, and the second end of the first cable being adapted to be attached to a second building;
the second cable comprising a first end and a second end;
the first end of the second cable being adapted to be affixed to the first building;
the second end of the second cable being adapted to be guided to the second building along the first cable by a guide member;
the second end of the second cable being lower in elevation than the first end of the second cable;
the first cable docking device being located at the second building and configured to receive and secure the second end of the first cable;
the first cable launching device being configured to launch the second end of the first cable to the first cable docking device;
the second cable docking device being adapted to be located at the second building and configured to receive and secure the second end of the second cable;
the first cable further comprising a first cable tensioner adjacent to the second end of the first cable;
the second cable further comprising a second cable tensioner adjacent to the second end of the second cable;
the first cable docking device comprising a catching parasol located at the second building;
the first cable further comprising an attachment means at the second end of the first cable, and the catching parasol comprising a catching means, the attachment means being adapted to be anchored to the catching means;
the second cable further comprising a ball-like member at the second end of the second cable;

the second cable docking device comprising a mounting plate and a securing assembly;

the mounting plate comprising a ball-shaped groove adapted to receive a ball-like member of the second cable;

the securing assembly comprising a spring latch and a cover;

the spring latch being configured to push the cover to close the ball-shaped groove; and the cover comprising a slit adapted for the second cable to travel through.

17. The building emergency egress and rescue system as claimed in claim 16, wherein the second cable is a steel cable.

18. The building emergency egress and rescue system as claimed in claim 16, wherein the first cable launching device comprises an unmanned aerial vehicle.

19. The building emergency egress and rescue system as claimed in claim 16, wherein the attachment means comprises a hook, and the catching means comprises a plurality of barbs arranged at an interior surface of the catching parasol.

20. The building emergency egress and rescue system as claimed in claim 16, further comprising:

a harness adapted to be worn by a user; and the harness being provided with a pulley adapted to slide along the second cable from the first building to the second building.

* * * * *